Patented Aug. 11, 1931

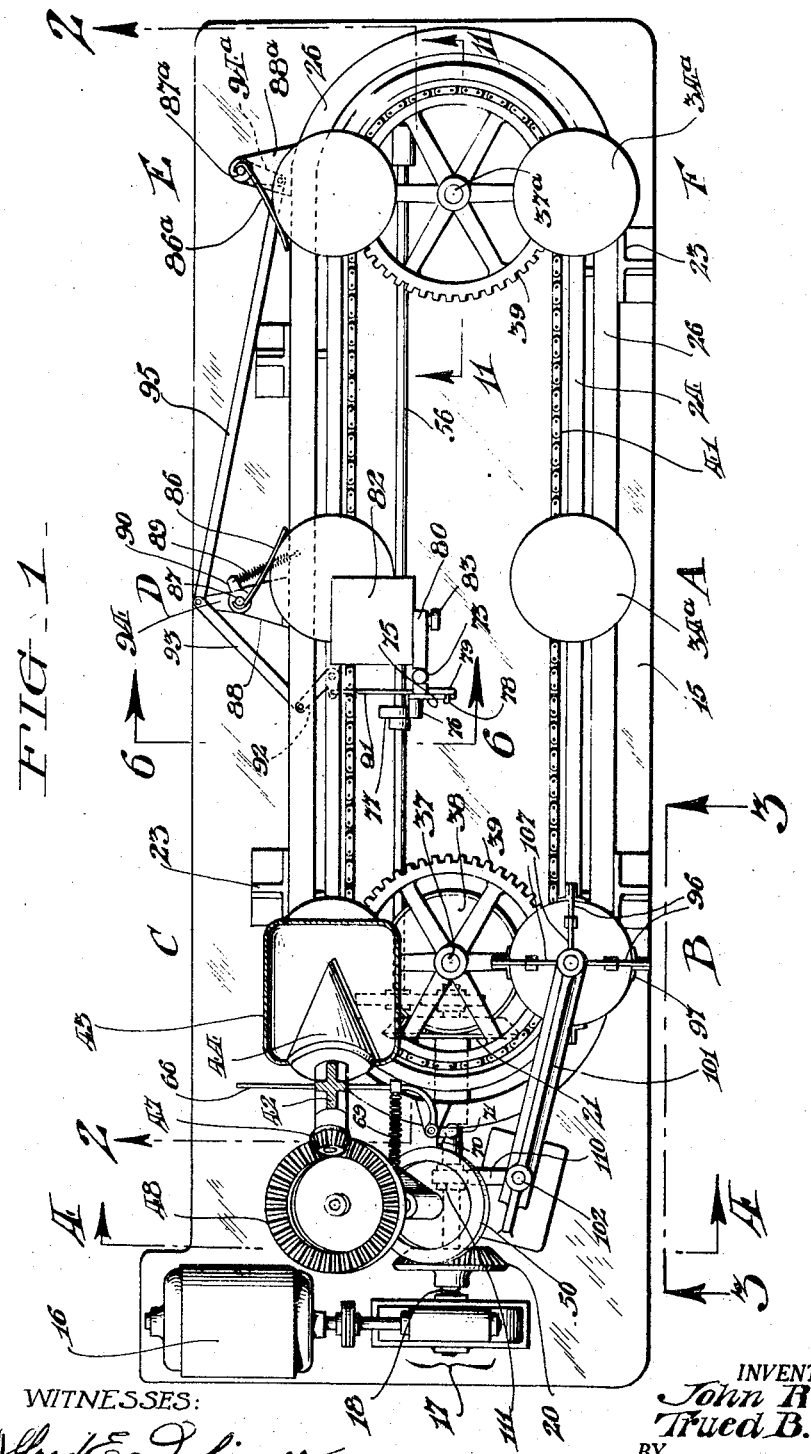

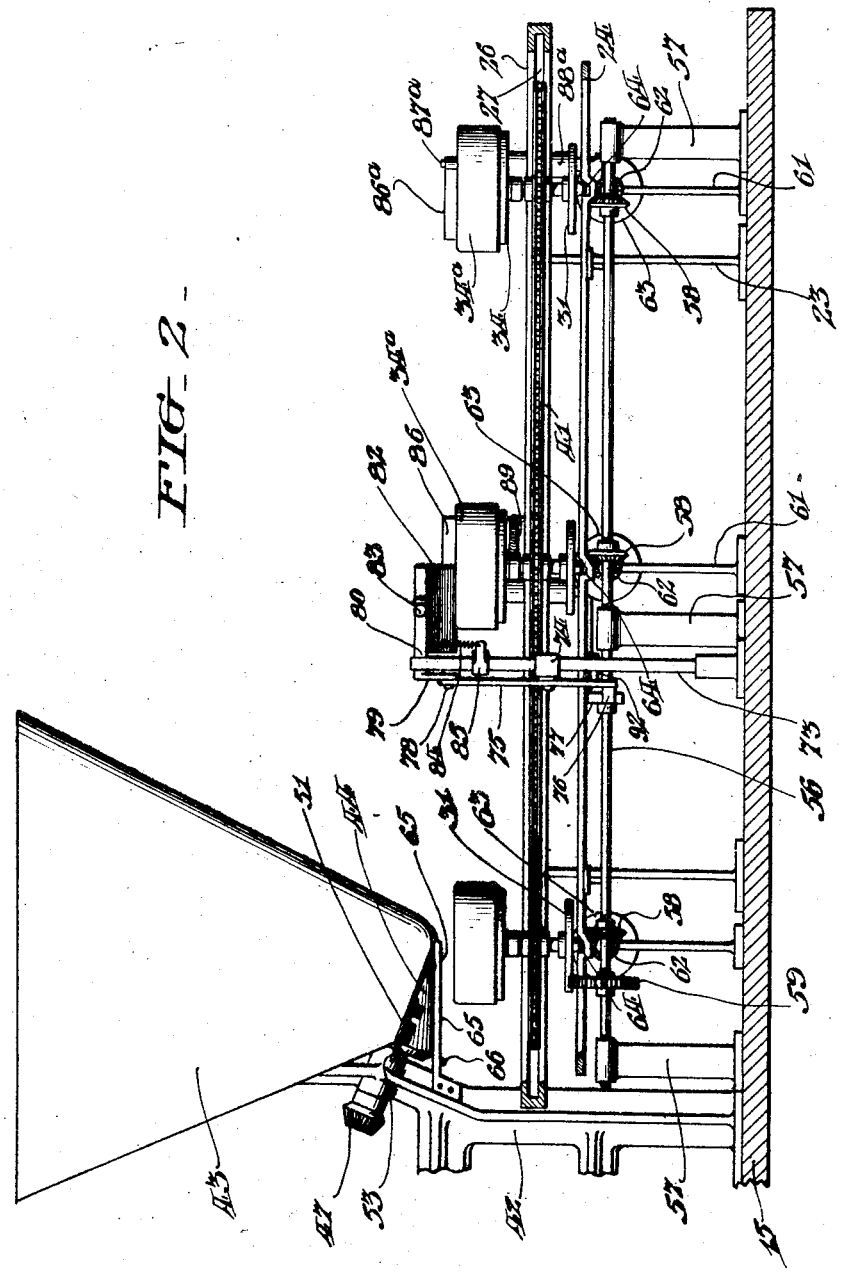

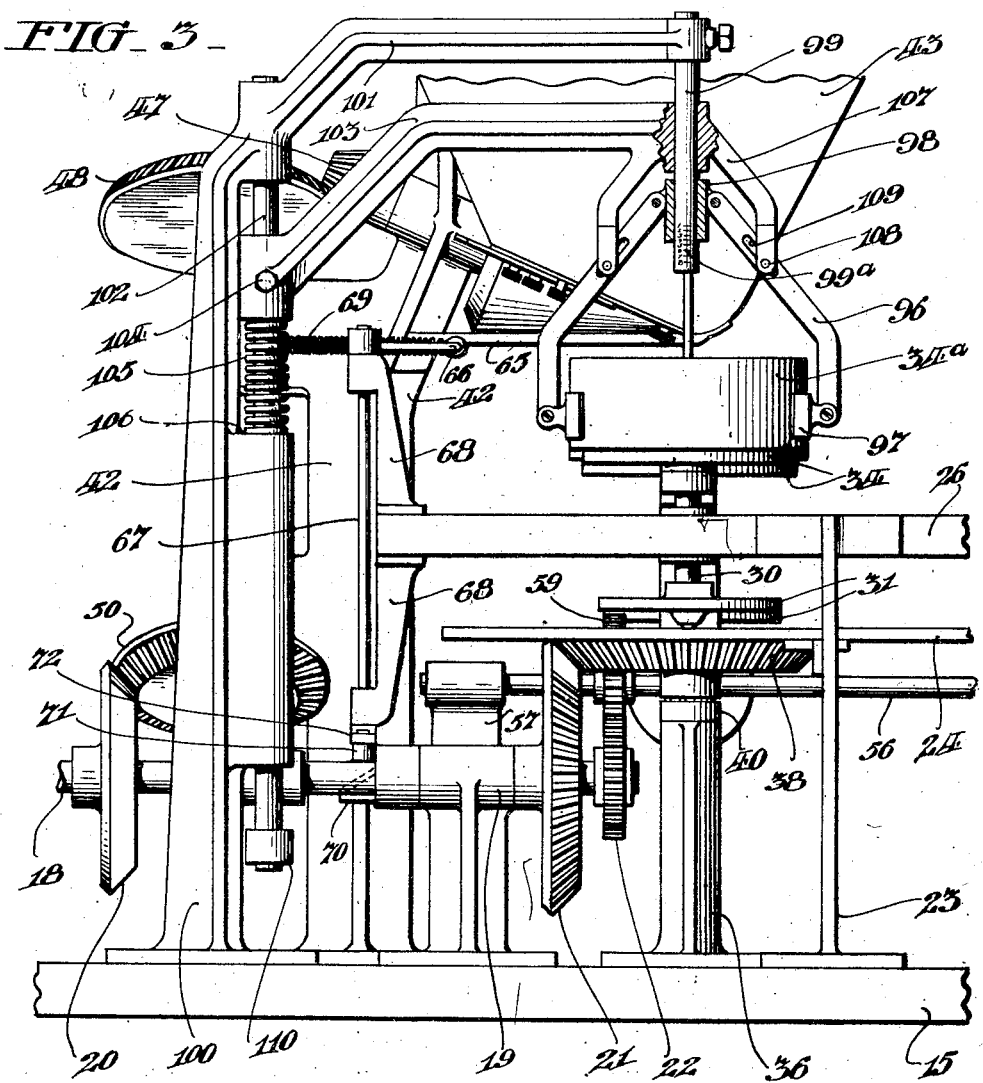

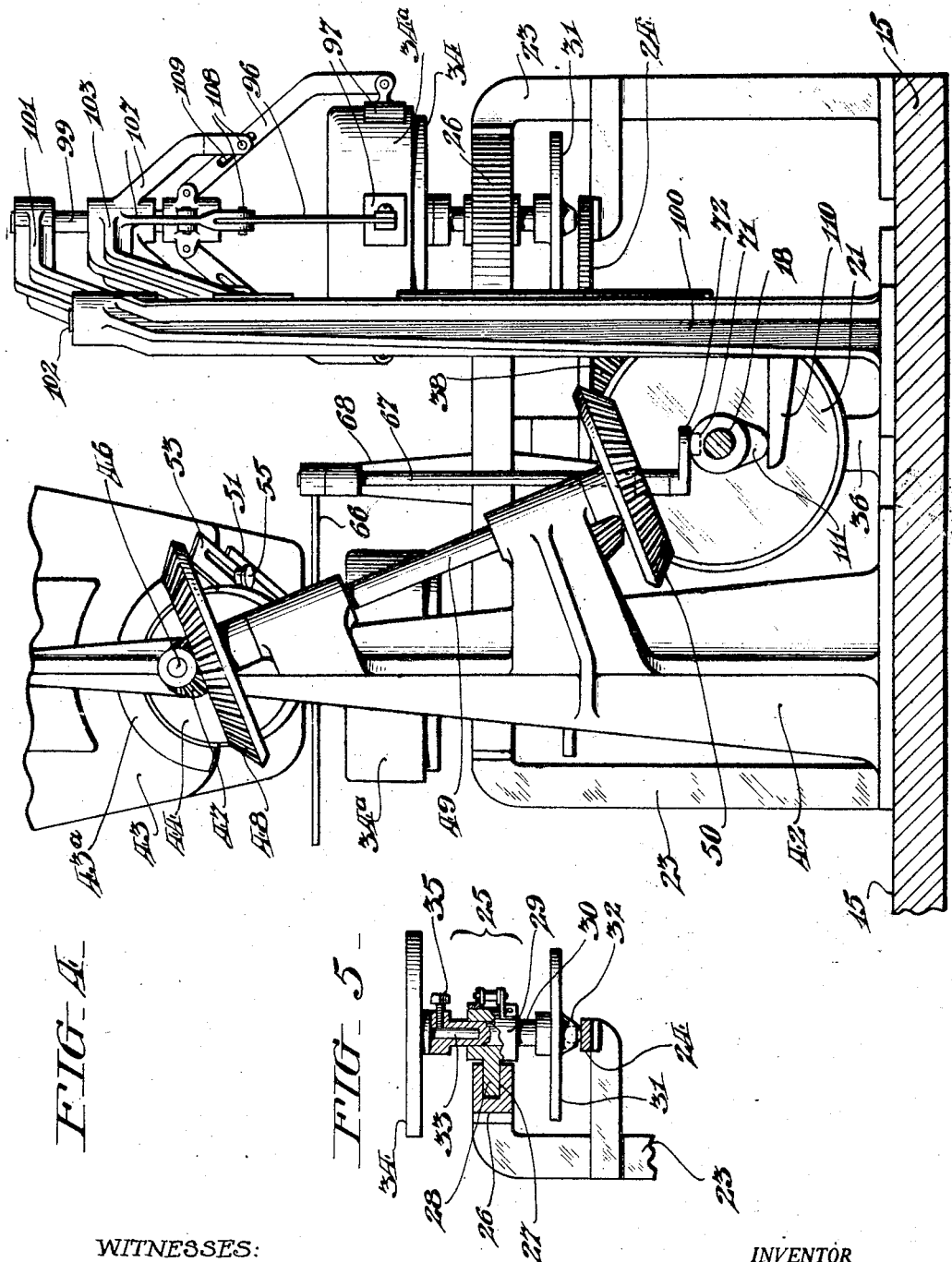

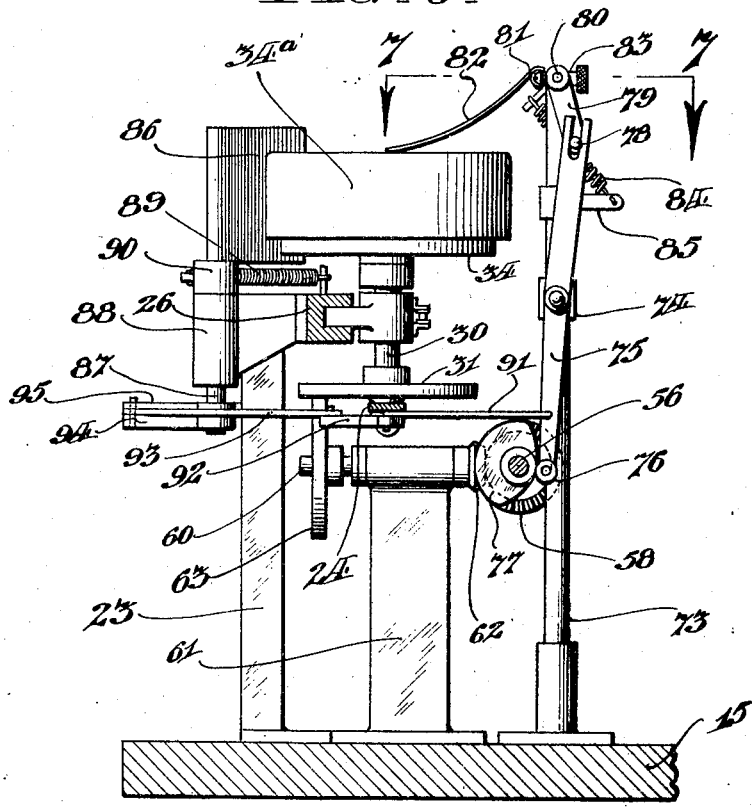

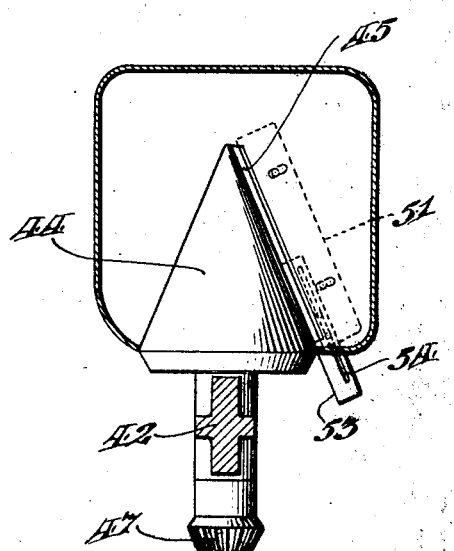
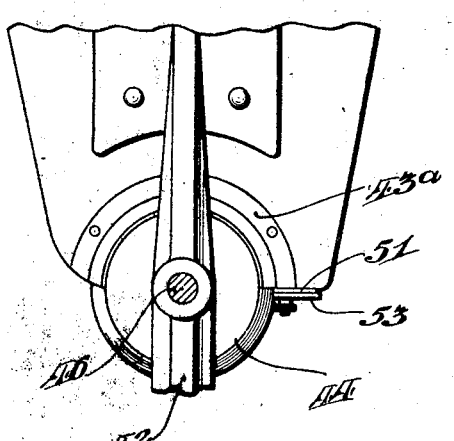
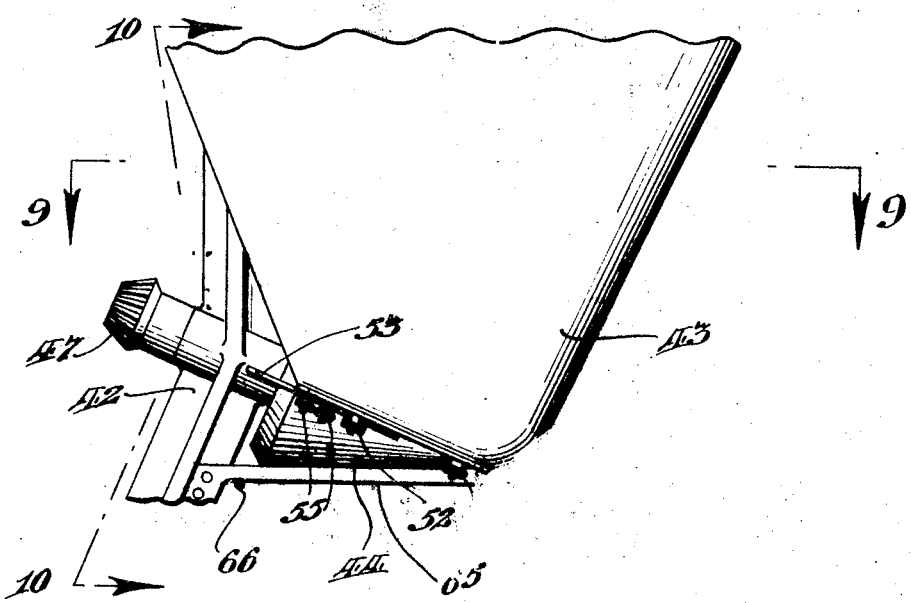

1,818,412

UNITED STATES PATENT OFFICE

JOHN R. LITTY AND TRUED B. LUNDIN, OF PHILADELPHIA, PENNSYLVANIA

CAKE ICING MACHINE

Application filed May 14, 1927. Serial No. 191,341.

This invention relates to a machine for icing cakes and particularly to a machine for icing round cakes.

The object of this invention is to provide an improved machine for quickly and conveniently coating cakes, particularly round cakes, with icing or frosting.

Another object of the invention is to provide a machine which will so coat the cakes with a uniform thickness of icing.

According to the invention the machine for coating round cakes with icing comprises a frame, a plurality of tables for supporting cakes, a plurality of stations along the course which the said cakes follow, means for moving said tables along said course, means for positioning the cakes on said tables, a hopper located above one of said stations, means for rotating the table which comes under said hopper, means for depositing a measured layer of icing on said cake during the rotation thereof, and means for spreading the icing over the cake.

The drawings illustrate an embodiment of the invention and the views therein are as follows:

Figure 1 being a top plan view of a machine embodying our invention, the top of the hopper having been omitted, Figure 2 a fragmentary longitudinal sectional view taken substantially on line 2—2 on Figure 1, Figure 3 a fragmentary front elevation, drawn to an enlarged scale and taken substantially on line 3—3 on Figure 1, certain parts being broken away for the sake of clearness.

Figure 4 is an enlarged vertical section, taken substantially on line 4—4 on Figure 1, and Figure 5 a detail, partly in section, of a cake carrying means.

Figure 6 is an enlarged vertical section taken substantially on line 6—6 on Figure 1, and Figure 7 a sectional view, partly in full, taken on line 7—7 on Figure 6.

Figure 8 shows the icing feed roll disposed in a fragment of the hopper,

Figure 9 is a section on line 9—9 on Figure 8, and

Figure 10 a section on line 10—10 on Figure 8,

Figure 11 is a detail of construction taken on line 11—11 on Figure 1.

Referring now more in detail to the drawings, the machine is provided with a base 15 on one end of which is mounted a motor 16 and a reduction unit 17 adapted to drive a main shaft 18 journaled in a bearing 19 also mounted on base 15. Shaft 18 has a mutilated bevel gear 20 fixed near reduction unit 17, a mutilated bevel gear 21 on the opposite side of bearing 19, and a spur gear 22 adjacent gear 21; each of these gears being adapted to drive mechanism which will be described hereinafter.

A plurality of track supports 23 are mounted on base 15 and support a continuous track 24, the two sides of which are parallel and the ends semi-circular, which is adapted to support carriers 25. Supports 23 extend above track 24 and support an endless guide 26, which is spaced from track 24 throughout its length and has a groove 27 formed in its inner face and adapted to receive a lug 28 forming a part of a bearing 29 in which is rotatably mounted a shaft 30 having a friction disk 31 fixed to its lower end and incorporating a ball bearing 32 adapted to ride on track 24. The upper end of shaft 30 is bored to accommodate the stem 33 of a cake carrying table 34 which is held against rotation therein by means of a set screw 35 and is interchangeable with tables of other diameters to accommodate cakes 34ᵃ of different sizes.

A bearing 36 is mounted on base 15 and has rotatably mounted therein a shaft 37 on which is keyed a bevel gear 38 and a sprocket 39; bevel gear 38 meshing with mutilated gear 21 and resting on an anti-friction bearing 40. A bearing 36ᵃ is mounted near the other end of base 15 and has rotatably mounted therein a shaft 37ᵃ on which is fixed a second sprocket 39. An endless sprocket chain 41 encircles sprockets 39 which are of such diameter that sprocket chain 41 is disposed in close proximity to the face of guide 26. Carriers 25 are suitably secured to chain 41 at spaced intervals and are adapted to be carried around on track 24 by the movement of chain 41, which is moved intermittently due to mutilated gear 21 meshing with gear 38, and are held vertically on track 24 by lug 28 sliding in groove 27 in guide 26.

Carriers 25 are spaced apart a distance equal to one half the circumference of sprocket 39 and teeth are omitted from one half of mutilated gear 21. Any number of cake carriers may be employed but we find six to be a satisfactory number and have shown the machine so equipped; three being disposed along the front and three along the back of the machine with the end carriers disposed on the transverse centerlines of sprockets 39 and the other two carriers midway between. Sprokets 39 rotate in a clockwise direction and, for the sake of convenience, the locations shown in Figure 1 will be designated as stations A, B, C, D, E and F respectively, starting with the loading station A at the front center and ending with the discharge station F at the right front.

A hopper support 42 is mounted on base 15 and supports a hopper 43 having a conical roller 44 abutting one edge of a triangular opening formed in its bottom and spaced from the other edge of the opening so as to form a feed slot 45. Roller 44 is fixed to a shaft 46 rotatably mounted in a bearing formed in hopper support 42 and having a bevel pinion 47 fixed on its other end and meshing with a bevel gear 48 fixed to a shaft 49, rotatably mounted in bearings formed on hopper support 42, and having a bevel gear 50 fixed to its other end and meshing with mutilated gear 20. It is evident that when the teeth on gear 20, which are formed on one half its circumference only, come into mesh with the teeth on gear 50, roller 44 will be rotated and tend to feed material in hopper 43 through feed slot 45 onto the cake on carrier 25 at station C. The width of slot 45 is regulated by means of a slotted plate 51, held in adjusted positions by thumb screws 52, while its length is regulated by means of a plate 53 adapted to engage the side of roller 44 and having a slot 54 through which thumb screws 55 pass for holding it in adjusted positions. It is to be understood that the end of slot 45, and consequently the point of conical roller 44, is disposed above the center of station C so that, as table 34 rotates, material may flow through slot 45 onto the entire top of a cake on the table. A guard 43ª is secured to the side wall of hopper 43 and abuts the end of roller 44 to prevent material from leaking out of the hopper at this point.

A shaft 56, journaled in suitable bearings 57 on base 15, is provided with three bevel pinions 58, disposed at stations C, D and E, and with a spur gear 59 which meshes with gear 22. Shafts 60, rotatably mounted in bearings 61, are provided on one end with bevel pinions 62, meshing with pinions 58, and on their other ends with friction disks 63 which are adapted to contact with and rotate friction disks 31. At these three stations, depressions 64 are formed in track 24 so that carriers 25 may drop at these points and bring friction disks 31 into contact with friction disks 63 which are rotating at all times and which consequently give rotary movement to tables 34 at these stations; it will be noted that the pinions 58 at stations C and D mesh with one side of their respective pinions 62 and rotate tables 34 in one direction while the pinion at station E meshes with the opposite side of its pinion 62 so that it rotates its table 34 in the opposite direction. It will also be noted that depression 64 has an abrupt vertical face on the side from which carriers 25 approach and a sloping face on the opposite side so that ball bearing 32 may ride up this inclined face and support its carrier on the normal surface of track 24.

Material fed from hopper 43 is of such consistency that it clings to roller 44 and is scraped therefrom by a scraper 65 disposed above the center line of the cake when same is at station C. When roller 44 ceases to rotate, a sheet of icing will hang from scraper 65 and be liable to drop therefrom when there is no cake beneath, consequently, we provide a wiper 66 which is adapted to pass along the under edge of scraper 65 and shear the depending icing therefrom. Wiper 66 is preferably of small cross-sectional area and secured to a shaft 67 rotatably mounted in bearings 68 mounted on guide 26. Wiper 66 is normally held in inoperative position by a spring 69, having one end secured to the wiper and the other end to hopper support 42, and is operated by a cam 70 fixed on shaft 18 and engaging a roller 71 mounted on the end of a lever 72 fixed to the end of shaft 67. It will be evident that, as shaft 18 rotates, the face of cam 70 will engage roller 71 and swing wiper 66 outwardly and across the bottom of scraper 65 and, as soon as the rise in the cam face has passed roller 71, spring 69 will quickly retrieve wiper 66.

As the icing is fed on the top of the cake only, it must be spread evenly thereon, allowing the excess to flow over the edges, then it must be spread to evenly cover the sides, and we accomplish this in the following manner: A post 73 is fixed to base 15 adjacent station D and carries a sleeve 74 on which is pivoted a lever 75 having a roller 76 mounted on its lower end and adapted to engage a cam 77 fixed on shaft 56. The upper end of lever 75 is bifurcated and straddles a pin 78 secured in the end of a lever 79 mounted on the reduced end of a shaft 80 and held in adjusted positions by means of a set screw 81. A flexible spreading plate 82 is secured to shaft 80 by means of a single bolt 83 so that it may be adjusted relatively to the axis of shaft 80 in order to accommodate it to the surfaces of cakes which are higher or lower in the center than at the edges. Spreading plate 82 is adapted to be held in contact with the top of a cake by a spring 84 having one end secured to the plate and the other end secured to an arm 85 adjustably secured to post 73 so that the tension of spring 84 may be regulated by moving arm 85 on post 73.

A second resiliently mounted spreading plate 86 is fixed to a shaft 87 rotatably mounted in a bearing 88, fixed to guide 26, and resiliently held in contact with the side of a cake by means of a spring 89 having one end secured to a collar 90, adjustably mounted on shaft 87, and its other end secured to guide 26; the tension on spring 89 being regulated by turning collar 90 on shaft 87. A link 91 has one end connected to lever 75 and its other end connected to one arm of a bell crank 92, rockably mounted on the under side of track 24, and a link 93 has one end connected to the other arm of bell crank 92 and its other end connected to the end of a lever 94 fixed on shaft 87.

As shaft 56 rotates, the face of cam 77 will come in contact with roller 76 and raise spreading plate 82 off the top of the cake while lever 94 will move spreading plate 86 away from the side of the cake through its connection to lever 75 through links 91 and 93 and bell crank 92. As soon as shaft 56 has rotated sufficiently to move the face of cam 77 away from roller 76, spreaders 82 and 86 will be brought into contact with the cake by the action of springs 84 and 89 respectively.

A spreading plate 86$^a$, mounted on a shaft 87$^a$ journaled in a bearing 88$^a$ secured to guide 26 at station E, is actuated in unison with spreading plate 86 by means of a link 95 having one end connected to lever 94 and its other end connected to a lever 94$^a$ fixed on the bottom end of shaft 87$^a$.

Cakes are centered on table 34 at station B by means of four fingers 96 having contacts 97 adjustably mounted on their lower ends while their upper ends are pivoted to a bearing 98 adjustably secured on a shaft 99. A post 100 is mounted on base 15 and provided with an arm 101 in the end of which shaft 99 is secured by means of a suitable set screw. A shaft 102, slidably mounted in bearings formed on post 100, has an arm 103 adjustably fixed thereto by means of a set screw 104 and resting on a coiled spring 105 encircling shaft 102 and supported on a shoulder 106 formed on post 100. The outer end of arm 103 is bored to accomodate shaft 99 and provided with four depending arms 107, the lower ends of which are bifurcated and provided with pins 108 which extend through slots 109 formed in fingers 96.

A contact 110 is fixed to the lower end of shaft 102 and adapted to be engaged by a cam 111 fixed on shaft 18. As shaft 18 rotates, cam 111 will engage contact 110 and move shaft 102 downwardly against the action of spring 105 and cause arm 103 to carry arms 107 downwardly so that pins 108 will slide in slots 109 and move fingers 96 inwardly and bring contacts 97 into engagement with the sides of a cake and center same on table 34. As cam 111 disengages contact 110, spring 105 will move arm 103 upwardly and consequently move contacts 97 away from the cake. The centering mechanism is adjustable for different sizes of cakes by moving bearing 98 on shaft 99, a scale 99$^a$ being provided thereon to facilitate such adjustments, and may be adjusted for height by moving shaft 99 through arm 101 and arm 103 on shaft 102.

Assuming that hopper 43 contains icing, that cakes 34$^a$ are placed on tables 34 as they successively reach loading station A, and removed as they reach station F, the machine will operate as follows: Motor 16 being started, shaft 18 will be rotated and gear 21, which has teeth on but one-half of its circumference, will cause gear 38 and sprockets 39 to make a half revolution and move each table 34 from one station to the next and, as gear 21 has no teeth for one-half of its circumference, tables 34 will remain at their stations during the other half revolution of shaft 18. As soon as sprockets 39 cease to turn, cam 111 will engage contact 110 and actuate the above described centering mechanism and properly center the cake on the table at station B. As gear 20 has teeth on the one-half of its circumference oppositely disposed to the blank space on gear 21, gear 50 and roller 44 have been standing idle during the movement of the tables from one station to the next, however, as soon as the tables come to a stop, the teeth on gear 20 engage gear 50 and causes rotation of roller 44 with the consequent feeding of material from hopper 43 onto the cake disposed on the table at station C. As the end of the row of teeth on gear 20 leaves gear 50, rotation of roller 44 will cease and the face of cam 70 will contact with roller 71 and cause wiper 66 to whip across the bottom of scraper 65 and sever the icing depending therefrom, and be immediately retrieved by the action of spring 69.

Simultaneously with the stopping of roller 44, gear 21 meshes with gear 38 and moves the tables to another station. As a carrier 25 arrives at station D, ball bearing 32 will drop into depression 64 and bring friction disk 31 into contact with friction disk 63 so that table 34 is rotated. The same operation occurs at station E with the exception that table 34 is rotated in the opposite direction. Cam 77 is so timed that it will release roller 76 as soon as carrier 25 drops into depression 64 and thus allow springs 84 and 89 to bring spreading plates 82, 86 and 86$^a$ into engagement with the cakes; plate 82 pressing and smoothing the icing on the top of the cake while spreading plate 86 smoothes the icing on the side of the cake at station B but wiping it in one direction only. However, some kinds of icing require wiping in both directions in order to make it adhere properly to the cake and this is accomplished when the cake arrives at station E by the action of plate 86ª which extends in a direction opposite from plate 86 and, as before stated, table 34 is operated in the opposite direction at this station.

It is understood that the operations on cakes 34ª at stations B, C, D and E are simultaneous and take place during one-half rotation of sprockets 39 and that all operations at these stations are suspended during the other half of a revolution of sprockets 39, at which time the carriers are moved from one station to the next. As the loaded carriers arrive at station F, the cakes are removed and cared for in the customary manner. Thus a cake is completely iced and delivered at discharge station F during each half revolution of the sprockets and it is found that the machine is capable of taking the place of a large number of hand operatives.

Functionally, the sequence of operations is: the cakes are loaded at station A, centered at station B, the icing deposited and the icing depending from the feed-roller removed at station C, the icing spread on the top and sides of the cake at stations D and E, and the cake discharged at station F.

While we have shown one means of carrying our invention into effect, it will be readily understood that other means may be employed and that a number of modifications may be made without departing from the spirit of the invention, and hence we do not limit ourselves to the precise construction set forth, but consider that we are at liberty to make such changes and alterations as fairly come within the scope of the appended claims.

We claim:

1. A cake coating machine including a frame; a hopper on the frame, a rotatable table, for receiving a cake and movable along a path in the frame for bringing the table under the hopper; a roller for feeding material from the hopper onto the cake; and means for intermittently rotating the roller; the rotation of said roller being timed to the movement of the table in its path so that said rotation occurs when and only when the table is positioned under the hopper.

2. A cake coating machine including a frame; a hopper on the frame; a table, for receiving a cake, movable along a path in the frame; means for positioning the table under the hopper; a conical roller for feeding material from the hopper onto the cake; and means for intermittently rotating the roller and so related to the movement of the table that the rotation of the roller will occur when and only when the table is positioned under the hopper.

3. A machine for coating articles with material, including a frame; a hopper on the frame; a rotatable table, for receiving the article to be coated, said table being movable to position the table under the hopper; means for rotating the table when under the hopper; a roller for feeding a layer of material from the hopper onto the article to be coated; and means for intermittently rotating the roller when the table is under the hopper.

4. A machine for coating articles with material including a frame; a hopper on the frame; a rotatable table, for receiving the article to be coated movable in the frame so as to pass under the hopper; means for rotating the table when under the hopper; means for feeding a layer of material from the hopper onto the article to be coated; and means for intermittently rotating the feeding means, said feeding means having one end in line with the axis of rotation of the table.

5. A machine for coating articles with material, including a frame; a hopper on the frame; a rotatable table, for receiving the article to be coated, movable in the frame; means for centering said article on the table; means for positioning the table under the hopper; means for rotating the table under the hopper; a conical roller for feeding a layer of material from the hopper onto the article to be coated; and means for intermittently rotating the roller when the table is under the hopper.

6. A machine for coating articles with material comprising a frame, a plurality of stations thereon, a series of rotatable tables for receiving articles to be coated, the tables being connected and held in spaced relation to one another, means for intermittently moving the articles from one station to the next, means for rotating the tables at certain stations, a hopper above one station, means for depositing a quantity of coating material on the article on the table beneath the hopper, means for spreading the material on the article in one direction at another station, and means for spreading said material in the opposite direction at still another station.

7. A machine for coating articles with material including a base; a pair of sprockets rotatable above the base; a conveyor carried by the sprockets; a track mounted on the base and disposed in fixed relation to the path of the conveyor; a plurality of stations on the track; a carrier, for receiving an article to be coated, supported by the track and attached to the conveyor at each station; means for intermittently rotating the sprockets for moving the carriers from station to station; a hopper above one of the stations; and means for feeding material from the hopper onto the article to be coated.

8. A machine for coating articles with material including a base; a pair of sprockets rotatable above the base; a conveyor carried by the sprockets; a track mounted on the base and disposed in fixed relation to the path of the conveyor; a plurality of stations on the track; a carrier, for receiving an article to be coated, supported by the track and attached to the conveyor at intervals corresponding to the distances between the succeeding stations; means for intermittently rotating the sprockets for moving the carriers from station to station; a hopper above one of the stations; and means for feeding material from the hopper onto the article to be coated.

9. A machine for coating articles with material including a base; a pair of sprockets rotatable above the base; a conveyor carried by the sprockets; a track mounted on the base and disposed in fixed relation to the path of the conveyor; a plurality of stations on the track; a rotatable carrier, for receiving an article to be coated, supported by the track and attached to the conveyor at each station; means for intermittently rotating the sprockets for moving the carriers from station to station; means for rotating the carriers at certain of the stations; a hopper above one of the stations; and means for feeding material from the hopper onto the article to be coated.

10. A machine for coating articles with material including a base; a pair of sprockets rotatable above the base; a conveyor carried by the sprockets; a track mounted on the base and disposed in fixed relation to the path of the conveyor; a plurality of stations on the track; a carrier, for receiving an article to be coated, supported by the track and attached to the conveyor at each station; the distance between each two carriers being equal to one half the circumference of a sprocket; means for intermittently rotating the sprockets a half revolution; a hopper above one of the stations; and means for feeding material from the hopper onto the article to be coated.

11. In a machine for coating articles with material, having a frame, a hopper on the frame, means for delivering material from the hopper onto an article on the carrier therebeneath including a conical roller so disposed in the bottom of the hopper that an opening is formed adjacent one side of the roller; a scraper engaging a side of the roller; and means for rotating the roller.

12. In a machine for coating articles with material, having a frame, a hopper on the frame, means for delivering material from the hopper onto an article on the carrier therebeneath including a conical roller so disposed in the bottom of the hopper that an opening is formed adjacent one side of the roller; means for changing the size of the opening; a scraper engaging a side of the roller; and means for rotating the roller.

13. In a machine for coating articles with material, having a frame, a hopper on the frame, means for delivering material from the hopper onto an article on the carrier therebeneath including a conical roller so disposed in the bottom of the hopper that an opening is formed adjacent one side of the roller; a guard secured to the hopper and engaging the roller for sealing in the contents of the hopper; a scraper engaging a side of the roller; and means for rotating the roller.

14. In a machine for coating articles with material, having a frame, a hopper on the frame, means for delivering material from the hopper onto an article on the carrier therebeneath including a conical roller so disposed in the bottom of the hopper that an opening is formed adjacent one side of the roller; means for intermittently rotating the roller whereby material in the hopper will cling to the roller and be carried through the opening; a scraper engaging the roller for scraping the material therefrom; and a wiper for shearing off the material depending from the scraper.

15. In a machine for coating articles with material, having a frame, a hopper on the frame, means for delivering material from the hopper onto an article on the carrier therebeneath including a conical roller so disposed in the bottom of the hopper that an opening is formed adjacent one side of the roller; means for intermittently rotating the roller whereby material in the hopper will cling to the roller and be carried through the opening; a scraper engaging the roller for scraping the material therefrom; a wiper engaging the scraper; and means for actuating the wiper as the roller ceases to revolve.

16. In a cake icing machine having a frame and cake carriers movable in the frame; means for centering a cake on a carrier including a vertical shaft in the frame; a bearing adjustably mounted on the vertical shaft; cake centering fingers hinged to the bearing and adapted to engage a cake; a post slidable in the frame; a support on the post; arms on the support slidably connected to the fingers; and means for raising and lowering the post.

17. In a cake icing machine having a frame; an operating shaft rotatable in the frame and cake carriers movable in the frame; means for centering a cake on a carrier including a vertical shaft in the frame; a bearing adjustably mounted on the vertical shaft; cake centering fingers hinged to the bearing and adapted to engage a cake; a post slidable in the frame; a support on the post; arms on the support slidably connected to the fingers; a spring on the frame tending to hold the post against downward movement; a contact on the post; and a cam on the operating shaft, whereby rotation of said shaft will cause the cam to engage the contact and move the post downwardly against the action of the spring.

18. In a cake icing machine having a frame, a track in the frame, and a guide adjacent the track having a groove in its face; a cake carrier adapted to rest on the track and including a bearing, a lug on the bearing slidable in the groove, a shaft rotatable in the bearing, and a table attached to the shaft.

19. In a cake icing machine having a frame, a track in the frame, and a guide adjacent the track and having a groove in its face; a cake carrier adapted to rest on the track and including a bearing; a lug on the bearing slidable in the groove; a shaft, having a bore in its upper end, rotatable in the bearing; a stem in the bore; a table on the stem; and a friction disk on the bottom of the shaft.

20. In a cake icing machine having a frame, stations on the frame, rotatable cake carriers movable in the frame and friction disks on the cake carriers; means for rotating the carriers at certain stations including a longitudinal shaft rotatable in the frame; gears on the shaft; counter shafts at certain stations rotatable in the frame; gears on the counter shafts meshing with the gears on the longitudinal shaft; friction disks on the counter shafts adapted to contact with the friction disks on the cake carriers; and means for rotating the longitudinal shaft.

21. In a cake icing machine having a frame, stations on the frame, rotatable cake carriers movable in the frame and friction disks on the cake carriers; means for rotating the carriers at certain stations including a longitudinal shaft rotatable in the frame; gears on the shaft; counter shafts at certain stations rotatable in the frame; gears on the counter shafts meshing with the gears on the longitudinal shaft; friction disks on the counter shafts; means for bringing the friction disks on the cake carriers into positive contact with the disks on the counter shaft; and means for rotating the longitudinal shaft.

22. In a cake icing machine having a frame, stations on the frame, rotatable cake carriers movable in the frame and friction disks on the cake carriers; means for rotating the carriers at certain stations including a longitudinal shaft rotatable in the frame; gears on the shaft; counter shafts at certain stations rotatable in the frame; gears on the counter shafts meshing with the gears on the longitudinal shaft; friction disks on the counter shafts adapted to contact with the friction disks on the cake carriers; and means for rotating the longitudinal shaft, said disks and gears being so arranged that certain cake carriers will be rotated in opposite directions.

23. In a machine for icing cakes having a base, stations on the base, rotatable cake carriers movable on the base, counter shafts for rotating the carriers at certain of the stations, and means for depositing icing on the cake; means for spreading the icing including a spreader adapted to contact with the top of the cake; a spreader adapted to contact with the side of the cake; resilient means for holding the spreaders against the cake; and means for moving said spreaders away from said cake.

24. In a machine for icing cakes having a base, stations on the base, rotatable cake carriers movable on the base, counter shafts for rotating the carriers at certain of the stations, and means for depositing icing on the cake; means for spreading the icing including a spreader adapted to contact with the top of the cake; a spreader adapted to contact with the side of the cake at one station; a spreader adapted to contact with the side of the cake at a second station; resilient means for holding the spreaders against the cake; and means for moving said spreaders away from said cake.

25. In a machine for icing cakes having a base, stations on the base, rotatable cake carriers movable on the base, counter shafts for rotating the carriers at certain of the stations, and means for depositing icing on the cake; means for spreading the icing including a resilient spreader adapted to contact with the top of the cake; a resilient spreader adapted to contact with the side of the cake; springs for holding the spreaders against the cake; means for adjusting the tension on the springs; and means for moving said spreaders away from said cake.

26. In a machine for icing cakes having a base, stations on the base, rotatable cake carriers movable on the base, counter shafts for rotating the carriers at certain of the stations, and means for depositing icing on the cake; means for spreading the icing including a resilient spreader adapted to contact with the top of the cake; means for tilting the top spreader to conform to the plane of the top of the cake; a resilient spreader adapted to contact with the side of the cake; resilient means for holding the spreaders against the cake; and means for moving said spreaders away from said cake.

27. In a machine for icing cakes having a base, stations on the base, rotatable cake carriers movable on the base, counter shafts for rotating the carriers at certain of the stations, and means for depositing icing on the cake; means for spreading the icing including a post on the base; a top spreader pivoted on the post; a spring tending to swing the spreader downwardly; a crank fixed to the top spreader; a lever pivoted to the post and having one end engaging the crank; a cam on one of the counter shafts adapted to engage the other end of the lever and swing the spreader against the action of the spring; a shaft journaled above the base; a side spreader fixed to the shaft; a spring tending to swing the side spreader toward the cake; and a lever arm fixed on the shaft and mechanically connected to the lever.

28. In a machine for icing cakes having a base, stations on the base, rotatable cake carriers movable on the base, counter shafts for rotating the carriers at certain of the stations, and means for depositing icing on the cake; means for spreading the icing including a post on the base; a top spreader pivoted on the post; a spring tending to swing the spreader downwardly; a crank fixed to the top spreader; a lever pivoted to the post and having one end engaging the crank; a cam on one of the counter shafts adapted to engage the other end of the lever and swing the spreader against the action of the spring; a shaft journaled above the base; a side spreader fixed to the shaft; a spring tending to swing the side spreader toward the cake; a lever arm fixed on the shaft and mechanically connected to the lever; a second side spreader swingably mounted at an adjacent station; and means connecting the side spreaders to one another.

29. A cake coating machine including a frame; a hopper on the frame; a rotatable table for receiving a cake, said table being movable in the frame; means for positioning the table under the hopper; a roller for feeding material from the hopper onto the cake; and means for intermittently rotating the roller and means for rotating the table simultaneously with the rotation of the roller.

In testimony whereof we have signed our names to this specification.

JOHN R. LITTY.
TRUED B. LUNDIN.